United States Patent [19]
> Lazarchik et al.

[11] 3,787,857

[45] Jan. 22, 1974

[54] DUAL MODE RADIOMETRIC SYSTEM
[75] Inventors: Robert E. Lazarchik, Largo; Robert S. Roeder, Dunedin; Donald R. Runkle, Clearwater, all of Fla.
[73] Assignee: Sperry Rand Corporation, New York, N.Y.
[22] Filed: May 18, 1972
[21] Appl. No.: 254,707

[52] U.S. Cl. ........................... 343/100 ME, 343/6 R
[51] Int. Cl. .............................................. G01w 1/00
[58] Field of Search .. 343/5 W, 6 ND, 100 ME, 6 R

[56] References Cited
UNITED STATES PATENTS
3,599,207   8/1971   Foiani ........................... 343/100 ME
3,380,055   4/1968   Fow et al. ........................... 343/100

*Primary Examiner*—Maynard R. Wilbur
*Assistant Examiner*—Richard E. Berger
*Attorney, Agent, or Firm*—Howard P. Terry

[57] ABSTRACT

An improved microwave radiometric system features operation selectively in a passive mode and in an active mode providing incoherent noise illumination of a selected target for improving the measured radiometric temperature contrast between the target and its spatial background and for increasing the distance at which such a target may be detected. Broad band noise is continuously transmitted during the active mode and the receiver is continuously active.

10 Claims, 2 Drawing Figures

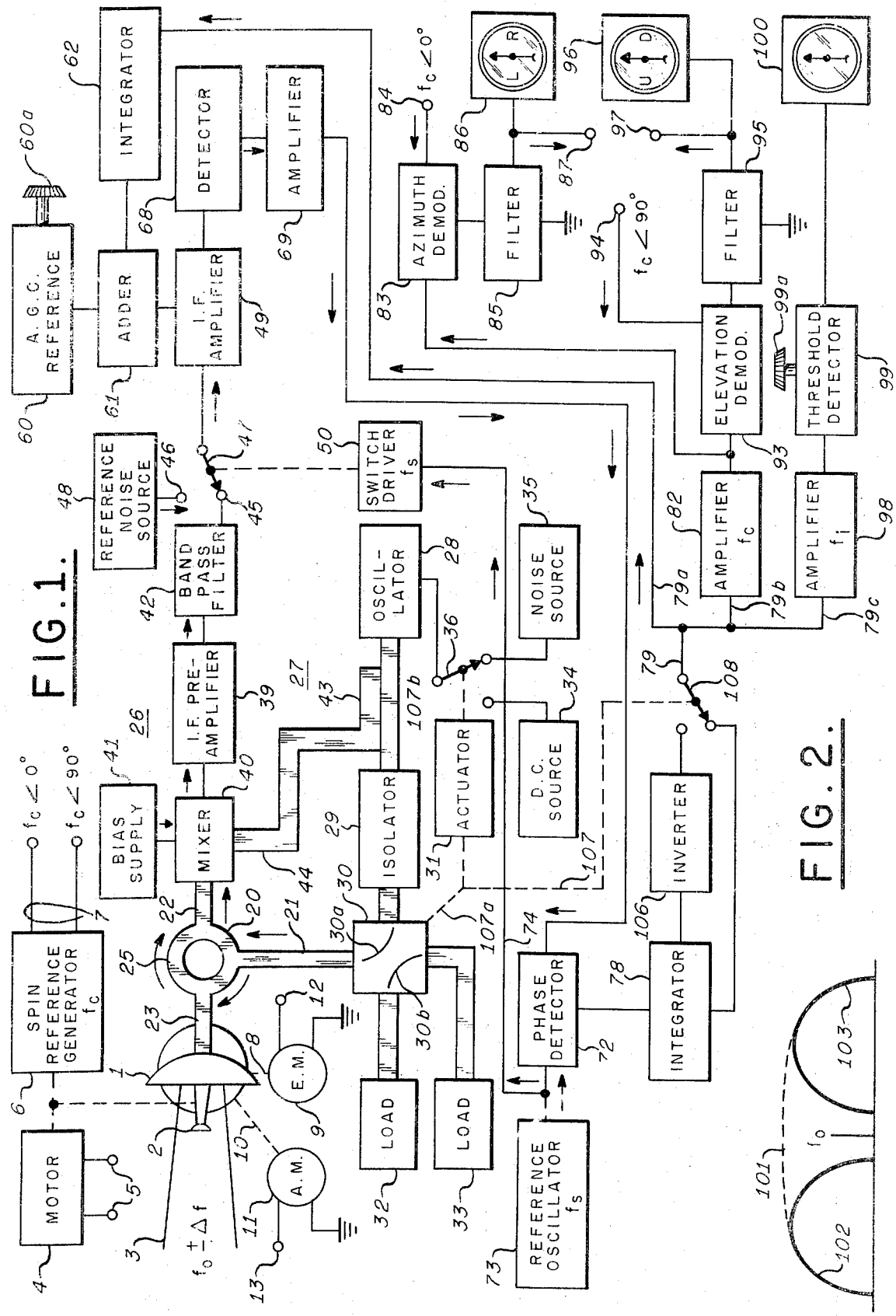

DUAL MODE RADIOMETRIC SYSTEM

BACKGROUND OF THE INVENTION

1. Field of the Invention

The invention pertains to the art of high frequency radiometry using comparison of the amplitude of a signal to be investigated, such as a thermal or other noise signal, to the amplitude of a locally generated noise reference signal. In this type of radiometer receiver, an amplitude detector is connected alternately and cyclically through noise receiver elements and then to the local reference noise signal generator. The invention more particularly relates to such a radiometric system in which continuously operated broad band noise generation apparatus is provided for illuminating the selected target through the single antenna, thus augmenting the apparent temperature of the selected target with respect to its spatial background.

2. Description of the Prior Art

The comparison type of radiometer receiver has been the most widely used for the study of relatively low-level noise-like radio frequency signals, especially where the amplitudes of the noise signals to be examined are often small in comparison to the internally generated noise level within the radiometer receiver. Comparison radiometer systems achieve substantial cancellation of the receiver background noise and self-noise, permitting relatively accurate measurements of low-level radio frequency signals.

Where there are other types of comparison radiometers, one popular type of radiometer particularly for use in the high frequency or microwave frequency bands is that in which a version of an incoming signal to be investigated and a standard or calibrated reference noise signal are compared. The method employed consists essentially of the comparison of the unknown noise signal amplitude coming from the source to be examined with a known amplitude noise signal from a calibrated source, and the method can be used to measure the effective temperature of an unknown source with considerable accuracy. In such instruments, the input to receiver elements may be switched between the unknown signal and the local noise reference generator signal at a relatively high rate, and the detected and amplified receiver output is coupled to a phase sensing detector operated in synchronism with the switching rate. The final unidirectional output signal from such a radiometer receiver is proportional to the difference between the temperature of the noise reference signal source and the temperature of the source viewed by the radiometer antenna, since the phase sensing detector acts automatically to subtract the receiver background or internal noise.

Passive radiometric systems, including those of the above described kind, have distinct advantages in that they are passive and therefore do not interfere with the operation of other radio equipment; they also operate with utility in most types of weather, are simple and reliable, and are relatively inexpensive. However, the performance of such prior art radiometric systems with respect to targets at relatively great ranges has been less than fully satisfactory because of the limited basic radiometric temperature contrast between such selected targets and their spatial background. Furthermore, there is a significantly increasing dilution effect at large target distances because of the constant angular width receptivity pattern of directive antennas normally employed in radiometer systems (i.e., as distance increases, the radiometer antenna collects proportionally more spatial background noise with respect to signals received directly from the selected target).

SUMMARY OF THE INVENTION

The present invention is an improved radiometric system providing means for detecting targets at relatively great distances and for accurately performing illuminated or passive radiometric measurements thereupon.

In the invention, signals such as target signals to be investigated are received by a suitable antenna and are compared with reference signals provided by a reference signal generator. Normally, the signals being compared are broad band or white noise signals. A switching device cyclically and repeatedly applies the received and reference signals within the intermediate frequency section of the radiometer receiver. The output of the detector of the radiometer receiver is an alternating signal having a strong component at the same time frequency as that at which the switch is operated. The alternating component is applied through a suitable amplifier to a phase sensitive detector, thence to a signal integrator circuit and may operate a display calibrated in terms of temperature.

The novel radiometer equipment may be operated in a generally conventional manner as a passive radiometric system or may be used in a second mode providing continuous transmissions of broad band, incoherent noise signals for illumination of a remote target under examination. The broad band noise power is continuously transmitted, being directed by the radiometer's single antenna to the selected target. The transmitter and receiver elements cooperate with the single directive antenna, the high frequency portion of the radiometer system being supplied with a novel signal generation and isolation system for permitting continuous wave transmission when the system is operated in its active mode. Thus, fundamental defects of prior art comparison radiometers are overcome; i.e., the limited temperature contrast of the usual target with respect to its spatial background is circumvented as well as the aforementioned dilution effect characteristic of conventional radiometric antennas.

BRIEF DESCRIPTION OF THE DRAWINGS

FIG. 1 is a block diagram of the novel radiometric system showing its components and their electric interconnections.

FIG. 2 is a graph useful in explaining the operation of the apparatus of FIG. 1.

DESCRIPTION OF THE PREFERRED EMBODIMENT

In the present invention, a radiometric system adaptable to use in any of several applications is illustrated. Accordingly, it will be understood that the antenna 1 represents only one of several possible antennas which may be employed advantageously within the invention. Though other types of antennas may be used, such as other gimbal mounted tracking or searching antennas or simple directive antennas affixed to the fuselage of a manually or automatically steerable craft, the invention is shown for purposes of illustration as utilizing a particular paraboloidal tracking antenna having a transmission line antenna feed 2 adapted for conical scanning (at a spin frequency $f_c$) of the directive radiation pattern 3 associated with paraboloid 1 about a bore sight axis. Conical scan is effected in a conventional manner when drive motor 4 is supplied with power at its terminals 5.

If conical scan is in fact employed, a spin reference generator 6 is also driven by motor 4, yielding quadrature sinusoidal reference voltages $f_c \angle 0°$ and $f_c \angle 90°$ at output terminals 7 for use as will be described. Paraboloid antenna 1 may be moved about a normally horizontal axis 8 when elevation motor 9 is actuated by appropriate search or track command signals applied to terminal 12. Likewise, antenna 1 may be moved about a vertical axis perpendicular to the plane of FIG. 1 by shaft 10 and azimuth drive motor 11 when the latter is supplied at terminal 13 with appropriate search or track command signals.

Antenna drive, gimbal support, and conical scan and search systems of the general kind shown in FIG. 1 are well known in the prior art; therefore, a detailed description of the antenna system is not necessary for present purposes. For example, antenna and gimbal systems of the required kind are described in the L.A. Maybarduk et al. U.S. Pat. No. 2,410,831, issued Nov. 12, 1946, for a "Scanning Device" and assigned to the Sperry Rand Corporation. Similar arrangements are disclosed in many other places in the prior art, including the E.B. Hammond U.S. Pat. No. 2,740,962 for a "Three-Axis Tracking System," issued Apr. 3, 1956, and also assigned to the Sperry Rand Corporation.

The transmission line feed 2 of antenna 1 is coupled through one of its branching port arms 23 to a conventional transmission line circulator device 25 having branching port arms 21, 22, and 23. Port arm 22 is coupled to a radiometer receiver system 26, while port arm 21 may be coupled to a transmitter system 27.

Transmission line switch 30, under control of actuator 31 and mechanical linkage 107a, has two possible states. In the state illustrated in FIG. 1, switch 30 couples port arm 21 through switch path 30a and through conventional high frequency signal isolator 29 and directional coupler 43 to voltage controlled oscillator 28. Switch path 30b simply interconnects matched loads 32 and 33 in a passive manner. With switch 30 in the illustrated position, actuator 31 also couples a conventional broad band modulation noise source 35 through switch 36 to supply a random noise voltage to voltage controlled oscillator 28. It is also understood that source 35 may additionally supply operating power to oscillator 28. In the second state of switches 30 and 36, switch 36 couples direct current source 34 to oscillator 28. Voltage controlled oscillator 28 may be a tunable Gunn diode oscillator which exhibits low spurious noise. Noise source 35 may be a commercially available Gaussian distribution white noise source of the noise diode type.

As previously noted, one arm port of circulator 25 is employed as an input to the radiometer receiver 26, where any signal in port arm 22 is first supplied to a low noise, wide band, balanced mixer 40, operated in a conventional manner with the assistance of bias current supply 41. A second input to receiver signal mixer 40 through transmission line 44 is the coupled output of directional coupler or signal sampling means 43, which supplies mixer 40 with a version of the output of oscillator 28. The output of mixer 40 is thus suitable for amplification by a conventional intermediate frequency amplifier 39, after which it is passed through band filter 42 to terminal 45 of switch 47. In the position shown for radiometer switch 47, the output of band pass filter 42 is connected to a second intermediate frequency or gain controlled amplifier 49 which has substantially the same band width and center frequency as amplifier 39.

Switch 47 is operated cyclically, being moved regularly at the switching frequency $f_s$ by switch driver 50 between terminals 45 and 46. When residing on terminal 46, switch 47 connects the conventional intermediate frequency noise reference source 48 to amplifier 49. Amplifier 49 is equipped internally with a conventional gain control circuit which may be supplied with a reference level setting voltage by a.g.c. reference circuit 60, manually controllable in the usual manner by adjustment 60a. The gain reference voltage from the conventional unit 60 is supplied through adder 61, which may be a simple algebraic summation circuit, for introducing a variable gain control voltage automatically from integrator 62, as will be explained.

The amplified output of amplifier 49, having been chopped at a convenient audio frequency $f_s$ by switch 47, has its envelope detected in the usual manner by the conventional envelope detector 68. The detected audio signal is amplified, as required, by audio amplifier 69. The detected signal is next supplied to one input of a conventional phase detector 72 to a second input of which is supplied a phase reference signal of frequency $f_s$. It is to be noted that the output of phase reference oscillator 73 is supplied both to the second input of phase detector 72 and also, via lead 74, to excite switch driver 50 for the purpose of cyclically operating switch 47. The output of phase detector 72 is passed to the conventional integrator circuit 78 and appears as a modified signal on output lead 79. Lead 79 supplies three branching channels 79a, 79b, and 79c further to be described.

It is to be observed that the output of integrator 78 is passed through switch 108, according to the action of actuator 31 and mechanical linkage 107. One of the switch 108 paths includes an inverting amplifier 106. It will be seen that the addition of the inverting amplifier and switch contacts is needed to provide the same polarity of the output signal when operating in either the active or passive radiometer modes. For example, in the active mode with the switch 108 contacts in the position shown, the output signal from a target would be positive (i.e., the target would have a higher effective radiometeric temperature than the background). With the switch 108 contacts in the other position corresponding to the passive mode the output signal would again be positive. The inverting amplifier is necessary because the basic passive radiometric temperature of the target is colder than the background.

Channel 79a supplies a signal for automatic gain control purposes to gain control integrator 62 for addition in adder 61 to the reference gain control voltage from unit 60.

Channel 79b utilizes the output of integrator 78, particularly the components of frequency $f_c$ of that output, by amplifying them in amplifier 82. The output of amplifier 82 is conducted to one input terminal of azimuth demodulator 83, whose other terminal 84 is supplied with the conical scan reference signal $f_c \angle 0°$ found on one of the output leads 7 of conical scan spin reference generator 6. The demodulated or phase detected signals may be filtered in filter 85 so that only a direct current, reversible polarity, varying amplitude component remains to be passed to a conventional left-right meter 86. Meter 86 indicates whether the bore sight axis of antenna 1 is pointing at a target or is to the left or to the right of it. Automatic tracking in azimuth may be assured by coupling the output of filter 85 through terminal 87 to terminal 13 of azimuth motor 11.

The output of amplifier 82 is supplied to one input terminal of elevation demodulator 93, whose other terminal 94 is supplied with the conical scan reference voltage $f_c \angle 90°$ found on a second of the output leads 7 of conical scan spin reference generator 6. The demodulated or phase detected signals may be filtered in filter 95, as in the case of filter 85, so that only a direct current, reversible polarity, varying amplitude component remains to be passed to a conventional up-down indicating electrical meter 96. Meter 96 indicates whether antenna 1 is pointed at a target or is directed above or below it. Automatic tracking in elevation may be achieved by coupling the output of filter 95 through terminal 97 to terminal 12 of antenna elevation motor 9.

It will be understood by those skilled in the art that other known types of azimuth and elevation tracking error indicators may be employed in lieu of the zero center meters 86 and 96, such as the cathode ray tube indicators of the W.N. Dean et al. U.S. Pat. Nos. 2,537,973 and 2,552,527, respectively issued Jan. 16, 1951 and May 15, 1951 and both assigned to the Sperry Rand Corporation. It will be understood by those skilled in the art that operators may, by viewing meters 86 and 96, position the azimuth and elevation positional control motors 9 and 11 by the manual operation of potentiometric signal sources adapted for feeding control voltages to the respective terminals 12 and 13. For search purposes, the voltages at terminals 12 and 13 may be varied according to any suitable program.

Channel 79c conducts the output of integrator 78 through an amplifier 98 tuned to frequency $f_i$ to threshold detector 99. The detection level of threshold detector 99 may be controlled by manual adjustment 99a so that signals above a predetermined level are passed to indicator 100. Thus, motion of the pointer of meter 100 from its illustrated zero position alerts the operator of the presence of a definite target.

When the invention is operated in th noise illumination or active mode, the objective is to illuminate a target of interest so that its apparent noise temperature is higher than that of the target's background. In this case, the transmission line switch 30 is moved to the position shown in FIG. 1. Also, the output of oscillator 28 is frequency modulated by the white noise spectrum generated in noise source 35. The noise-modulated energy is fed through isolator 29 and through path 30a of switch 30 into arm 21 of circulator 25. The circulator 25 permits substantial amounts of high frequency energy to flow around it only in the clockwise direction indicated by the arrows; it serves substantially to isolate the transmitter energy from receiver 26 and any received energy from oscillator 28. Thus, circulator 25 couples the noise modulated energy out through arm 23 to be radiated by antenna 1 and furthermore to couple any energy received by antenna 1 into receiver 26. The radiated and received energies have a common frequency $f_o \pm \Delta f$, since the signal $f_o \pm \Delta f$ is generated by noise modulation of the carrier $f_o$ of oscillator 28. It is to be noted that the value of $\Delta f$ also establishes the required band widths for amplifiers 39 and 49, for example.

During the noise illumination or active mode of operation of the system, local oscillator power is provided to mixer 40 from noise source 35 and oscillator 28 at frequency $f_o \pm \Delta f$ via directional coupler 43 and transmission line 44. In addition, there will be power from oscillator 28 passing through isolator 29 and leading in the substantially suppressed reverse sense from port arm 21 directly into port arm 22 of circulator 25 and thus into mixer 40. Furthermore, there will generally be some power reflected by any small impedance mismatches present in antenna 1 and its radome; this reflected power will also enter the signal port arm 22 of mixer 40. However, an important feature of this novel arrangement is that the time delay between the leaked and mismatch-reflected waves is substantially zero and, when these signals are mixed with the local oscillator signal in mixer 40, the difference frequencies produced will be substantially zero. Certainly, the undesired beat frequency signals will be well below the pass band of intermediate frequency amplifiers 39 and 49. In this novel manner, isolation is achieved in the high frequency portion of the system fully sufficient to permit simultaneous transmit and receive operation.

The frequency characteristics of the system may be discussed relative to FIG. 2. The high frequency parts of the system, including oscillator 28, are designed to operate at a center frequency of $f_o$ (say 35 gHz with a band width of at least 1 gHz) as represented by the all-inclusive line 101 of FIG. 2. The intermediate frequency signal out of mixer 40 is amplified by what may be a relatively low-gain preamplifier 39, fed through band pass filter 42, and then chopped by cyclic switch 47 at the audio frequency $f_s$ provided by reference oscillator 73.

Cyclic switch 47 operates alternately to sample the level of the received intermediate frequency signal from amplifier 39 and the fixed power level of the reference noise source 48. The resulting amplitude-modulated output of switch 47 is amplitude modulated in proportion to the difference between the reference noise signal from source 48 and the target return signal. The absolute value of the target return signal may thus be readily detected.

The audio envelope detector 68 following the gain controlled intermediate frequency amplifier 49 removes the switched amplitude modulation envelope. This recovered envelope contains the received target signature frequencies during search for a target and the conical scan pointing error signal frequency during track. The detected envelope is then passed from audio amplifier 69 to phase detector 72 and then through integrator 78 to the signal processing channels 79a, 79b, and 79c for extraction of the target detection signal and the quadrature tracking error signals.

Integrator 78 is a conventional integrator network having a time constant $\tau_s \gg 1/f_s$ ($f_s$ is the switching frequency). The second integrator 62 in the automatic gain control loop has a time constant $\tau_a \gg 1/f_c$ ($f_c$ is the conical scan frequency). Thus, filtering in the automatic gain control loop extends from zero frequency to a cut off frequency just below the conical scan frequency $f_c$. Accordingly, such a portion of the audio frequency is fed in effect from a low pass filter and via adder 61 for the control of the gain of amplifier 49 in the presence of variation in the amplitude of the target return.

Integrator 78, having its particular time constant $\tau_s \gg 1/f_s$ is adapted to pass the conical scan components of frequency $f_c$ in channel 79b to audio amplifier 82, which may be tuned at frequency $f_c$. These separated signals are then used, as previously described, to operate the conventional tracking indicator meters 86 and 96 or to control servo motors 9 and 11 in the conventional manner.

Integrator 78 is again adapted to pass any target signal detected during automatic or manual target search. Because search scan rates are relatively low, the target signal frequencies $f_t$ detected when a target is detected are correspondingly low. They are thus separated by passing the output of integrator 78 through the low pass amplifier 98 into threshold detector 99. Any target return greater in amplitude than the level set by adjustment 99a will actuate the meter 100 or a suitable alarm such as a bell, suggesting that target tracking be initiated.

In the second, or passive, mode of operation of the invention in which no energy is radiated, transmission line switch 30 is caused by actuator 31 to be rotated 90 angular degrees clockwise; also, switch 36 is moved to the output terminal of direct current source 34. Accordingly, isolator 29 is coupled by switch 30 through path 30a to load 33. Additionally, path 30b of switch 30 couples load 32 to circulator arm 21. Oscillator 28 now serves purely as a local oscillator, supplying the signal of frequency $f_o$ through the branching arm of directional coupler 43 and wave guide 44 to mixer 40. Any energy of frequency $f_o$ continuing to flow in the main line of coupler 43 passes through isolator 29 and is harmlessly absorbed in the terminating load 33. Additionally, no energy can pass into the transmit arm 21 of circulator 25 since arm 21 is coupled through the switch path 30b in the matched terminating load 32.

The receiver is then enabled to operate as a high sensitivity, double side band receiver and employs the spectrum bounded by lines 102, 103 of FIG. 2. The versatility of the invention is further extended, since a high degree of isolation is again provided between oscillator 28 and receiver 24. Other parts of the radiometer receiver system perform substantially as they did in the active mode previously described.

In tracking operation in either mode, the conical scan error modulation of the received signal is carried through receiver 26. After synchronous detection of the envelope of the switching frequency $f_s$, the resultant conical scan error signal is fed to azimuth and elevation demodulators 83 and 93, respectively. The quadrature voltages $f_c \angle 0°$ and $f_c \angle 90°$ from the two-phase conical scan reference generator 6 are fed to the respective error demodulators 83 and 93 as reference voltages. If the conically scanning antenna 1 is directly on target, there will be no error signal at the outputs of demodulators 83, 93. If the target is at an angle to the bore signal of antenna 1, but within the capture angle of antenna 1, error siganls will be produced whose magnitudes are measures of the departure of the bore signal from each axis and whose polarities indicate the sense of the errors. The quadrature tracking error signals may be fed to power amplifiers (not shown), if needed, to control elevation and azimuth gimbal motors 9 and 11, respectively, or may be fed directly to indicators such as meters 86 and 96.

In target search operation of the novel apparatus in either the active or passive mode, the appropriate azimuth and elevation signals are fed to gimbal motors 9 and 11. As antenna 1 sweeps through a predetermined programmed search pattern, the appearance of a reflecting target introduces a change in the received signal amplitude which will appear in the output of synchronous phase detector 72. If the change in signal level exceeds a predetermined level the indicator 100 is triggered.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. In a high frequency radiometric system having directive antenna means and radiometer receiver means including receiver signal mixer means with first and second mixer input port means;
    transmission line circulator means having third, fourth, and fifth port means,
        said antenna means being coupled to said third port means, and
        said receiver signal mixer means first input port means being directly connected to said fourth port means,
    oscillator means coupled to said fifth port means,
    signal sampling means coupled to transmission line means coupled between said oscillator means and said fifth port means for supplying a version of the output of said oscillator means directly to said second input port means of said receiver signal mixer means, and
    utilization means responsive to the output of said radiometer receiver means.

2. Apparatus of the character described in claim 1 further including broad band noise generator means for modulating the output of said oscillator means.

3. Apparatus of the character described in claim 2 further including:
    signal isolator means, and
    transmission line switch means having first and second states,
    said oscillator means, said isolator means, said transmission line means, said transmission line switch means when in said first state, and said fifth port means providing first series circuit means.

4. Apparatus of the character described in claim 1 further including:
    signal isolator means,
    transmission line switch means having first and second states,
    first and second load means,
    said oscillator means, said isolator means, said transmission line switch means when in said second state, and said first load means providing second series circuit means.

5. Apparatus of the character described in claim 4 wherein said fifth port means, said transmission line switch means when in said second state, and said second load means provide third series circuit means.

6. Apparatus of the character described in claim 5 including:
  actuator means, and
  unidirectional electrical supply means,
  said actuator means coupling said noise generator means to modulate said oscillator means output when said transmission line switch is in said first state, and
  said actuator means coupling said unidirectional electrical supply means to said oscillator means when said transmission line switch means is in said second state.

7. Apparatus of the character described in claim 1 wherein said radiometer receiver means includes:
  reference noise source means,
  radiometer switch means,
  gain controlled amplifier means, and
  reference oscillator means for operating said radiometer switch means for alternately coupling said reference noise source means or the output of said receiver signal mixer means to the input of said gain controlled amplifier means.

8. Apparatus of the character described in claim 7 additionally including:
  envelope detector means responsive to said gain controlled amplifier means,
  phase detector means responsive to said envelope detector means and to said reference oscillator means, and
  integrator means responsive to said phase detector means for controlling the gain of said gain controlled amplifier means.

9. Apparatus of the character described in claim 8 additionally including:
  motive means for conically scanning said antenna means about a bore sight direction at a predetermined scanning frequency for detecting a target,
  conical scan reference generator means responsive to said motive means,
  amplifier means tuned to said predetermined scanning frequency and responsive to said integrator means,
  demodulator means for generating azimuth and elevation error signals related to the displacement of said target from said bore sight direction, and
  means for utilizing said error signals.

10. Apparatus of the character described in claim 8 including:
  amplifier means responsive to said integrator means,
  threshold detector means responsive to said amplifier means, and
  indicator means responsive to said threshold detector means.

* * * * *